United States Patent
Glück et al.

(10) Patent No.: US 11,613,247 B2
(45) Date of Patent: Mar. 28, 2023

(54) MOTOR VEHICLE

(71) Applicant: AUDI AG, Ingolstadt (DE)

(72) Inventors: Christian Glück, Ingolstadt (DE); Alfred Rehr, Hepberg (DE); Dominik Polz, Pförring (DE)

(73) Assignee: AUDI AG, Ingolstadt (DE)

( * ) Notice: Subject to any disclaimer, the term of this patent is extended or adjusted under 35 U.S.C. 154(b) by 179 days.

(21) Appl. No.: 17/320,619

(22) Filed: May 14, 2021

(65) Prior Publication Data
US 2022/0017069 A1   Jan. 20, 2022

(30) Foreign Application Priority Data
Jul. 17, 2020   (DE) .................... 102020118923.0

(51) Int. Cl.
| | |
|---|---|
| *B60W 20/40* | (2016.01) |
| *B60K 6/50* | (2007.10) |
| *B60K 6/383* | (2007.10) |
| *B60K 17/35* | (2006.01) |
| *F16D 13/52* | (2006.01) |

(52) U.S. Cl.
CPC ............ *B60W 20/40* (2013.01); *B60K 6/383* (2013.01); *B60K 6/50* (2013.01); *B60K 17/3505* (2013.01); *B60Y 2200/92* (2013.01); *B60Y 2400/427* (2013.01); *F16D 13/52* (2013.01)

(58) Field of Classification Search
CPC ....... B60W 20/40; B60W 10/119; B60K 6/52; B60K 6/383; B60K 17/35; B60K 17/3505
See application file for complete search history.

(56) References Cited

U.S. PATENT DOCUMENTS

| | | | |
|---|---|---|---|
| 10,543,739 B1 * | 1/2020 | Zhou | ..................... B60W 20/10 |
| 10,982,723 B1 * | 4/2021 | Chacko | ................... F16D 23/12 |
| 2008/0004780 A1 * | 1/2008 | Watanabe | ............. B60K 6/445 |
| | | | 903/917 |

(Continued)

FOREIGN PATENT DOCUMENTS

| | | |
|---|---|---|
| AT | 007997 U1 | 12/2005 |
| DE | 60107691 T2 | 12/2005 |

(Continued)

OTHER PUBLICATIONS

German Examination Report dated Apr. 9, 2021 in corresponding German Application No. 10 2020 118 923.0; 10 pages, Machine translation attached.

*Primary Examiner* — Jeffrey J Restifo
(74) *Attorney, Agent, or Firm* — Maier & Maier, PLLC

(57) ABSTRACT

A motor vehicle, including a drivable front axle, a drivable rear axle, an internal combustion engine, an automatic transmission coupled thereto, and a switchable torque distribution unit which is coupled to the automatic transmission and enables all-wheel drive, which torque distribution unit is coupled to the front axle and the rear axle. A torque generated by the internal combustion engine can be directed from the torque distribution unit either to the front or rear axle or distributed to both axles. An electric machine is provided which is coupled to the rear axle. A torque generated by the electric machine which is provided to the rear axle is provided to the torque distribution unit via the coupling and can also be provided from this torque distribution unit to the front axle.

12 Claims, 1 Drawing Sheet

(56) References Cited

U.S. PATENT DOCUMENTS

| | | | | |
|---|---|---|---|---|
| 2008/0289894 | A1* | 11/2008 | Muta | B60K 6/52 |
| | | | | 180/248 |
| 2012/0271494 | A1* | 10/2012 | Kim | B60W 20/00 |
| | | | | 180/65.265 |
| 2013/0143706 | A1* | 6/2013 | Holmes | B60K 6/445 |
| | | | | 903/910 |
| 2013/0289810 | A1* | 10/2013 | Holmes | B60W 10/08 |
| | | | | 180/65.265 |
| 2014/0046538 | A1* | 2/2014 | Siegel | B60K 6/105 |
| | | | | 701/67 |
| 2014/0243149 | A1* | 8/2014 | Holmes | B60W 20/20 |
| | | | | 180/65.265 |
| 2014/0335995 | A1* | 11/2014 | Swales | B60K 6/485 |
| | | | | 477/3 |
| 2015/0328972 | A1* | 11/2015 | Friedmann | B60K 6/48 |
| | | | | 903/902 |
| 2016/0215869 | A1* | 7/2016 | Marutani | F16H 59/76 |
| 2016/0288792 | A1* | 10/2016 | Ando | B60W 30/18145 |
| 2017/0008422 | A1* | 1/2017 | Honda | B60W 20/15 |
| 2017/0240038 | A1* | 8/2017 | Spangler | B60W 10/119 |
| 2017/0326964 | A1* | 11/2017 | Lahr | B60K 6/36 |
| 2018/0079301 | A1* | 3/2018 | Kondo | B60K 17/35 |
| 2018/0134154 | A1* | 5/2018 | Shimizu | F16D 21/08 |
| 2018/0154882 | A1* | 6/2018 | Sasaki | B60K 6/52 |
| 2019/0031180 | A1* | 1/2019 | Lee | B60K 6/48 |
| 2019/0077258 | A1* | 3/2019 | Cho | B60K 6/52 |
| 2019/0118638 | A1* | 4/2019 | Hummel | B60K 6/387 |
| 2019/0315338 | A1* | 10/2019 | Espig | B60W 20/30 |
| 2019/0381989 | A1* | 12/2019 | Nozu | B60W 10/08 |
| 2020/0070655 | A1* | 3/2020 | Yaguchi | B60W 10/119 |
| 2020/0207330 | A1* | 7/2020 | Mizuno | B60K 6/448 |
| 2020/0255017 | A1* | 8/2020 | Siokos | B60K 17/354 |
| 2021/0101481 | A1* | 4/2021 | Satake | B60K 17/10 |
| 2021/0107448 | A1* | 4/2021 | Nose | B60K 6/445 |
| 2021/0107456 | A1* | 4/2021 | Kim | B60W 10/18 |
| 2021/0253088 | A1* | 8/2021 | Oguro | B60W 40/10 |
| 2022/0017069 | A1* | 1/2022 | Glück | B60K 6/52 |
| 2022/0055475 | A1* | 2/2022 | Hirosumi | B60K 17/3465 |
| 2022/0111833 | A1* | 4/2022 | Park | B60W 20/19 |
| 2022/0203956 | A1* | 6/2022 | Na | B60W 20/10 |
| 2022/0305901 | A1* | 9/2022 | Inoue | B60W 20/14 |
| 2022/0348184 | A1* | 11/2022 | Hiroi | B60W 10/119 |

FOREIGN PATENT DOCUMENTS

| | | |
|---|---|---|
| DE | 102010022912 A1 | 12/2011 |
| DE | 102014201355 A1 | 7/2015 |
| DE | 102014225337 A1 | 6/2016 |
| DE | 102018205818 A1 | 10/2019 |

* cited by examiner

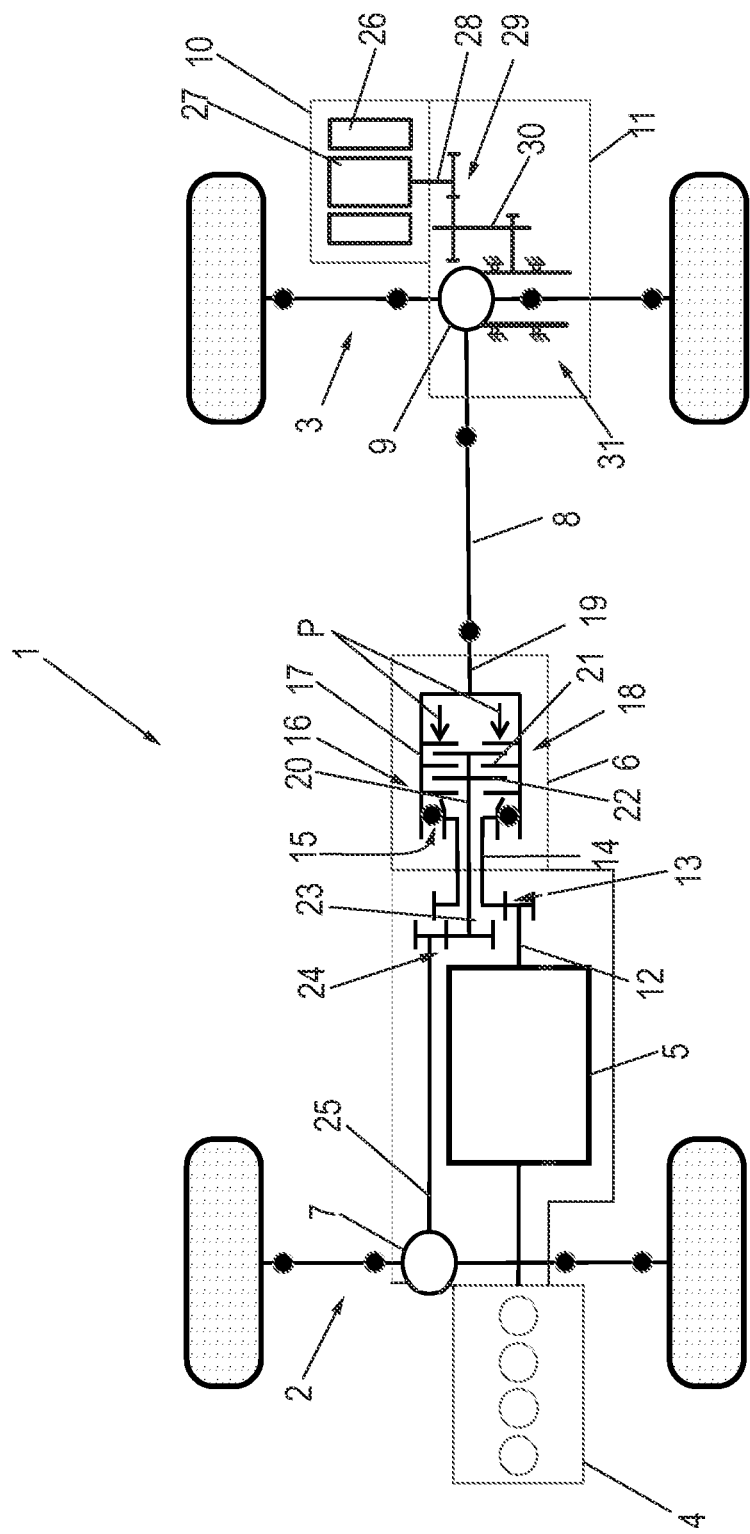

MOTOR VEHICLE

FIELD

The invention relates to a motor vehicle, comprising a drivable front axle, a drivable rear axle, an internal combustion engine, an automatic transmission coupled thereto, and a switchable torque distribution unit which is coupled to the automatic transmission and enables all-wheel drive, which torque distribution unit is coupled or can be coupled to the front axle and the rear axle, in which a torque generated by the internal combustion engine can be directed, from the torque distribution unit, either to the front or rear axle or distributed to both axles.

BACKGROUND

Such a motor vehicle with a conventional drive train, in which a conventional automatic transmission, typically also called a multi-step automatic transmission, is connected, and downstream of which a torque distribution unit, i.e. a switchable all-wheel drive element, is connected, enables a torque generated via the internal combustion engine and via the automatic transmission which has, for example, seven or eight gear stages, to be directed either only to one axle, i.e. either the front axle or the rear axle depending on the type of drive, or to the front and rear axles, so that an all-wheel drive results. Via the torque distribution unit, the respective proportion that is directed to the front and rear axles in all-wheel drive can be set to be the same or different. This enables the driver to choose different drive modes.

Motor vehicles are increasingly being equipped with an electric drive, a so-called electric rear axle preferably being provided, i.e. a complete rear axle comprising a differential and an electric machine that drives the rear axle directly. However, it is not possible to integrate such an electric rear axle into a motor vehicle with a conventional drive train as described above, in which, as stated, the torque distribution unit is connected downstream of the automatic transmission. The reason for this is that, in order to enable all-wheel drive via the electric rear axle, it must be coupled to the torque distribution unit in order to direct the torque generated by the electric machine, which is primarily directed to the rear axle, to be proportionally directed to the front axle so that this axle is also actively driven. Because, however, the torque distribution unit is coupled to the upstream automatic transmission, with a purely electrical drive, the automatic transmission driven via the internal combustion engine and the coupled rear axle are suspended on the same element of the torque distribution unit, the automatic transmission is also driven with a purely electric drive, i.e. is dragged or loaded in the direction of thrust. This is because the internal combustion engine is not in operation when the vehicle is driven purely electrically. In the best-case scenario, this only leads to drag torque, which represents a loss of power and has a negative effect on the electric range. Much more serious, however, is that the transmission is not supplied with lubricant when the vehicle is driven purely electrically, since the internal combustion engine is not in operation. In a conventional drive train of the type described above, the automatic transmission is supplied with lubricant from the internal combustion engine, i.e. the internal combustion engine provides the hydraulic supply and the lubricant is supplied to the transmission with sufficient pressure and in sufficient quantities. However, there is no such lubricant supply here, so that in this case the transmission can even be damaged during longer trips.

The invention is thus based on the object of specifying a motor vehicle that is improved in comparison.

SUMMARY

To achieve this object, an electric machine is provided according to the invention in a motor vehicle of the type mentioned, which electric machine is coupled to the rear axle, in which a torque generated by the electric machine, which is directed to the rear axle, is provided to the torque distribution unit via the coupling, and can then be provided from the torque distribution unit to the front axle, and in which a freewheel is provided between the automatic transmission and the torque distribution unit, via which freewheel the automatic transmission is decoupled from the torque distribution unit when the internal combustion engine is not running and via the electric machine when there is an axle drive.

In the motor vehicle according to the invention, an electric rear axle is provided, in which thus the electric machine is a fixed component of the rear axle, together with the rear axle differential. In order to basically enable all-wheel drive also in electrical operation, the electric machine is permanently coupled to the torque distribution unit, that is, there is a permanent mechanical coupling of the electric machine or its output to a corresponding input element of the torque distribution unit, e.g. via a corresponding cardan shaft that couples the differential of the rear axle to the torque distribution unit.

In purely electric mode, either only the rear axle can thus be driven if the switchable torque distribution unit is not switched to all-wheel drive. If all-wheel drive is desired, the torque distribution unit is switched accordingly and the torque provided by the rear axle to the torque distribution unit is also transmitted proportionally to the front axle.

In order to prevent the automatic transmission from also being dragged in the disadvantageous manner described in the introduction, a freewheel is provided according to the invention, which is provided between the automatic transmission and the torque distribution unit. This unidirectional freewheel makes it possible to decouple the automatic element from the torque distribution unit in purely electric driving mode. This is because the input element of the torque distribution unit, to which the torque coming from the rear axle is applied in electric driving mode, is also coupled to the automatic transmission so that, in internal combustion engine operation, the torque from the internal combustion engine can be provided to the rear axle via the automatic transmission. According to the invention, however, this coupling is now carried out via the interposed freewheel, which works in such a way that it decouples the torque distribution unit from the automatic transmission when the internal combustion engine is not in operation or is decoupled from the automatic transmission, so that the rear axle torque applied to the torque distribution unit cannot be supplied to the automatic transmission due to the decoupling.

Using this decoupling, an "electrification" of a conventional drive train is then possible, since internal combustion engine operation as well as electric machine operation can be implemented without adversely affecting the automatic transmission. Due to the fact that, in pure internal combustion engine operation, the freewheel has a coupling effect, that is, the torque from the internal combustion engine is provided to the torque distribution unit and from this either to the front axle or to the rear axle depending on the drive mode, or to both axles in the case of all-wheel drive. Since the torque is guided via the automatic transmission and since the internal combustion engine is in operation, a corresponding automatic lubricant supply system is ensured for the transmission. In pure electric mode, however, the automatic transmission is decoupled so that it is not also dragged and therefore cannot be damaged due to the lack of lubricant supply. In mixed operation, however, when both the internal combustion engine and the electric machine are in operation, a torque from the internal combustion engine is provided, via the automatic transmission, to the torque element by means of the coupling freewheel, which torque element also receives the torque generated on the rear axle, the resulting total torque then being distributed via the torque distribution unit in all-wheel drive mode. Since the internal combustion engine is in operation and consequently delivers both a torque and operates the hydraulic supply, an automatic lubricant supply system for the transmission is thus guaranteed.

The freewheel itself, i.e. the central component that ensures the coupling depending on the situation, is either a roller-ramp freewheel or a sprag freewheel. Such a roller-ramp or sprag freewheel has the corresponding roller-ramps or sprags on the freewheel inner part coupled to the gear output, while the outer part of the freewheel is coupled to the corresponding input element of the torque distribution unit. In one direction of rotation, the outer part can be rotated relative to the inner part without mechanical coupling; in the other direction of rotation, a corresponding mechanical, torque-stable coupling results directly. If the internal combustion engine is switched on, it thus supplies torque to the automatic transmission, the transmission output shaft inevitably engages and the freewheel inner part therewith, so that there is an immediate mechanical coupling to the outer part, and the supplied torque is passed on to the torque distribution unit. In the case of purely internal combustion engine operation, the torque from the internal combustion engine is the only applied torque; in the case of additional electric machine operation, the torque from the internal combustion engine contributes to the total torque along with the torque from the electric machine, which total torque is then distributed via the torque distribution unit if it is switched on accordingly, or works together with the torque from the electric machine solely on the driven rear axle.

The coupling of the automatic transmission to the torque distribution unit is expediently carried out via a hollow shaft. To this end, the transmission output is coupled to the hollow shaft via gearing, which is coupled to an input element of the torque distribution unit via the freewheel. The hollow shaft enables a central, rotationally symmetrical coupling to the input element of the torque distribution unit, for example an outer plate carrier of a plate clutch, which will be discussed below. The hollow shaft itself is coupled or connected to the inner part of the freewheel, while the outer part of the freewheel is coupled to the input element of the torque distribution unit.

The input element itself is coupled to an output element within the torque distribution unit or forms this output element at the output of the distribution unit, via which output element the torque distribution unit is coupled to a cardan shaft coupled to the rear axle. Accordingly, the torque generated from the internal combustion engine is passed on to the rear axle via the output element when the drive is purely from the internal combustion engine; however, it also simultaneously acts as an input element for the electric machine torque supplied on the rear axle side.

The torque distribution unit itself is preferably a multi-plate clutch or comprises one. Such a multi-plate clutch, also known as a hang-on clutch, can be used to couple the front axle to the rear axle drive in a simple and switchable manner Such a multi-plate clutch usually has at least one outer plate carrier, which represents the input element for the torque from the internal combustion engine and also for the torque from the electric machine. The multi-plate clutch further comprises an inner plate carrier which is coupled to a drive shaft extending to the front axle differential via a shaft, so that the torque to be distributed is hereby transferred to the front axle. Corresponding plates are arranged on the outer plate carrier as well as on the inner plate carrier, which are interposed, and this plate pack can be axially compressed via a suitable adjusting means, for example a hydraulic CSC actuator (CSC=Concentric Slave Cylinder), in order to transfer the torque introduced at the input element, i.e. the outer plate carrier, to the inner plate carrier in a frictional, compressed state.

This outer plate carrier, accordingly, represents the input element of the torque distribution unit. The plate carrier is coupled, via the freewheel, to the hollow shaft already described, a mechanical, non-rotatable connection only being provided when the hollow shaft is actively rotating, and thus when the internal combustion engine is running; otherwise, the freewheel has a decoupling effect. The outer plate carrier itself is, furthermore, coupled to an output shaft which forms the output element and on which the cardan shaft, which leads to the rear axle, is suspended.

BRIEF DESCRIPTION OF THE FIGURE

Further advantages and details of the present invention will be apparent from the exemplary embodiments described below and in reference to the FIGURE.

DETAILED DESCRIPTION

The FIGURE shows a motor vehicle 1 according to the invention, comprising a drivable front axle 2 and a drivable rear axle 3. Furthermore, an internal combustion engine 4 and an automatic transmission 5 coupled thereto, i.e. a multi-speed automatic transmission, which has, for example, seven or eight gear stages provided.

Downstream of the automatic transmission 5 is a torque distribution unit 6, via which a torque can be directed either only to the front axle 2 or the rear axle 3, depending on the defined type of drive of the motor vehicle, or to both axles 2, 3 as part of an all-wheel drive. For this purpose, the torque distribution unit 6 is coupled, on the one hand, to a front axle differential 7, which will be described in detail below, and to a rear axle differential 9 via a cardan shaft 8, which will also be described in detail below.

The rear axle 3 itself is an electric rear axle which has an electric machine 10 as a fixed axle component and a downstream electric machine gearbox 11 which is coupled to the differential 9.

The specific design of the entire drive train enables, on the one hand, a pure internal combustion engine drive via the rear axle 3 or an all-wheel drive driven by the internal combustion engine via the front axle 2 and rear axle 3. It is also possible to have a purely electric drive only via the rear axle 3 and an all-wheel drive via the rear axle 3 and the front axle 2. With a purely electric drive, whether it is a rear-axle drive or an all-wheel drive, it is ensured in any case that the automatic transmission 5 is decoupled from the torque distribution unit 6, i.e. is not also dragged when the internal combustion engine 4 is not in operation. To make this possible, an output shaft 12 of the automatic transmission 5 is coupled, via a gearing element 13, to a hollow shaft 14, which in turn has a freewheel 15, preferably a roller-ramp or sprag freewheel, with an input element 16, in the form of an outer plate carrier 17 in this case, which is connected as a torque distribution unit 6 designed as a multi-plate clutch 18. The outer plate carrier 17 is connected to an output shaft 19 of the torque distribution unit, which in turn is coupled to the cardan shaft 8, which in turn is coupled to the rear axle differential 9.

The multi-plate clutch 18 further comprises an inner plate carrier 20. Outer plates 21 are provided, in an axially displaceable manner, on the outer plate carrier 17, and inner plates 22 are provided, in an axially displaceable manner, on the inner plate carrier 20, the axial displacement being shown by the two arrows P. This plate pack can therefore be axially compressed and moved against a thrust bearing via an actuating means, e.g. a hydraulically operating CSC, so that the plates 21, 22 come into frictional engagement, and a torque present on the rotating outer plate carrier 17 can be provided to the inner plate carrier 20.

The inner plate carrier 20 is coupled to an output shaft 23, which in turn is coupled, via a gearing element 24, to a shaft 25 extending to the front axle differential 7, via which shaft the torque, i.e. the drive, is provided to the front axle 2.

The cardan shaft 8 is connected to the rear axle differential 9, as described, so that a torque supplied by the automatic transmission 5 can be provided to the rear axle differential 9, whereby the rear axle 3 can be driven.

The electric machine 10, the stator 26 and the rotor 27 of which are indicated here by way of example, is connected with its output shaft 28, via gearing 29, to an intermediate shaft 30, which extends to the actual rear axle gearing 31, which in turn is coupled to the differential 9. The torque generated by the electric machine 10 can hereby be transferred to the wheels.

As the FIGURE shows, the automatic transmission 5 as well as the gearing elements 13 and 24, the hollow shaft 14, the drive shaft 25, and the differential 27 can be integrated into a compact housing that is flanged, on the one hand, to the internal combustion engine 4 and to which, on the other hand, the torque distribution unit 6 is flanged with its housing. In a similar manner, because of the compact component of the electric rear axle 3, the electric machine gearbox 11 with its gearing element 31 and the rear axle differential 9 is integrated into a common housing, to which the electric machine 10 is then flanged with its housing, so that a very compact axle design results here as well.

The central element that enables a variable internal combustion engine and electric machine drive with simultaneous all-wheel engagement in connection with a decoupling of an automatic transmission 5 is the freewheel 15. This freewheel is, as described, a roller-ramp or sprag freewheel. The inner part of the freewheel 15, on which the roller-ramps or sprags are arranged, is connected to the hollow shaft 14, while the outer part of the freewheel 15 is coupled to the input element 16, in this case the outer plate carrier 17. The arrangement is such that the freewheel 15 closes when the hollow shaft 14 is actively driven via the automatic transmission 5 while the internal combustion engine 4 is running. The provided torque is transferred, via the outer plate carrier 17, to the output shaft 19, and thus via the cardan shaft 8 to the differential 9, so that the rear axle 3 is driven via the internal combustion engine 4.

If all-wheel drive is desired, the multi-plate clutch 18 is engaged, the plate pack of outer plates 21 and inner plates 22 is compressed, and they are brought into frictional engagement, so that the torque supplied by the internal combustion engine is also applied to the inner plate carrier 20 and from there, via the output shaft 24 and the drive shaft 25, to the front axle differential 7, and then via this to the front wheels.

In purely electric machine driving mode, i.e. when the internal combustion engine 4 is not in operation, the torque is generated solely via the electric machine 10 and transmitted, via the electric machine gearbox 11, to the differential 9 and via this to the rear wheels. Due to the coupling of the cardan shaft 8 to the differential 9, the cardan shaft 8 also rotates and, due to its connection to the output shaft 19, the outer plate carrier 17 also inevitably rotates. However, the outer plate carrier is decoupled from the stationary hollow shaft 14 via the freewheel 15, i.e. the hollow shaft 14 is not driven by this and thus the automatic transmission 5 is not dragged either. A purely electric machine drive is, therefore, only possible via the rear axle 3, without the automatic transmission 5 also being loaded in thrust at the same time.

If all-wheel drive is to take place with a purely electric drive, it is also possible here to easily axially compress the plate pack of outer plates 21 and inner plates 22 against the thrust bearing and bring it into frictional engagement so that the inner plate carrier 20, which has been still up to that point, is also driven to rotate. The then branched torque is in turn directed to the front axle 2 via the output shaft 23 and the drive shaft 25. The proportion of the torque at the front axle and the torque at the rear axle can be adjusted accordingly, similar to a pure internal combustion engine drive.

However, a mixed operation of an internal combustion engine drive and an electric machine drive is also possible. This means that it is possible to switch on the internal combustion engine 4 when the electric machine is driven, so that it supplies a torque to the automatic transmission 5, which transmits the torque via the hollow shaft 14. Since the hollow shaft rotates actively, there is automatically a frictional engagement within the freewheel 15, i.e. the inner part basically overtakes the outer part and an additional torque is applied, which is in addition to the torque from the electric machine. There is, consequently, a total torque comprising the torque from the internal combustion engine and the torque from the electric machine, which is then applied to the torque distribution unit 6. This can either then be branched to both axles 2, 3, which means that there is all-wheel drive. However, it is also conceivable to then only provide the total torque to the rear axle 3.

As a result of the decoupling of the automatic transmission according to the invention, a pure electric driving mode is possible, since the transmission of this conventional drive train is stationary because it is decoupled via the freewheel 15. Thus, there is no damage to the transmission, which is not actively being supplied with lubricant, since the internal combustion engine 4 is not in operation. Another advantage is that the torque of the electric rear axle 3 basically does not run via the automatic transmission, since it is distributed beforehand via the torque distribution unit 6, even with electric all-wheel drive. As a result, the performance of the transmission only has to be designed in relation to the torque delivered by the internal combustion engine 4. The freewheel decoupling according to the invention is also advantageous in terms of efficiency or drive efficiency, since the automatic transmission is not also dragged with a purely electric drive, which would lead to a relatively large drag torque and thus to a reduction in the electrical range. Instead, only the freewheel 15 has to be dragged with its outer part, but this does not lead to a noticeable drag torque.

Therefore, the inventive design of this drive train or the inventive integration of the freewheel 15 provided between the automatic transmission 5 and the torque distribution unit 6 allows the combination of a conventional drive train comprising an internal combustion engine and conventional automatic transmission 5 as well as a conventional torque distribution unit with an electric rear axle, without any disadvantages resulting with regard to the automatic transmission 5.

In addition, all forward and backward movements can also be implemented. In the case of pure forward travel using the internal combustion engine, the freewheel is closed, that is, it couples and the torque is passed on. Reverse travel via the internal combustion engine is not possible, since the freewheel is open in this case, that is, decoupled, although the hollow shaft 14 is rotating. However, since the shaft would turn in the opposite direction to reversing, the freewheel does not close.

In the case of a purely electric machine drive in the forward direction, the freewheel is open, which leads to the inventive decoupling of the automatic transmission that is not supplied with lubricant. Reverse travel via the electric machine is also possible, but here the freewheel is closed due to the reversed direction of rotation of the input element of the torque distribution unit, i.e. it engages the automatic transmission; it is dragged as an exception. However, this is not disadvantageous here, since such reverse travel only takes place for a very short time and at low speed, so that impairment of the transmission is excluded.

In the case of a hybrid drive via both the internal combustion engine and the electric machine, the freewheel is inevitably closed, since the internal combustion engine introduces and transmits the torque. If it is desired to travel in reverse with a given hybrid operation, the internal combustion engine is switched off for a short time and the reverse travel is achieved solely via the electric machine.

The invention claimed is:

1. A motor vehicle, comprising: a drivable front axle, a drivable rear axle, an internal combustion engine, an automatic transmission coupled thereto, and a switchable torque distribution unit which is coupled to the automatic transmission and enables all-wheel drive, which torque distribution unit is coupled or can be coupled to the front axle and the rear axle, wherein a torque generated by the internal combustion engine can be directed, from the torque distribution unit, either to the front or rear axle or distributed to both axles, wherein an electric machine is provided, which is coupled to the rear axle, wherein a torque generated by the electric machine, which is provided to the rear axle, is provided to the torque distribution unit via the coupling and can also be transmitted from this torque distribution unit to the front axle, wherein a freewheel is provided between the automatic transmission and the torque distribution unit, via which freewheel the automatic transmission is decoupled from the torque distribution unit when the internal combustion engine is not running and via the electric machine when there is an axle drive.

2. The motor vehicle according to claim 1, wherein the freewheel is a roller-ramp freewheel or a sprag freewheel.

3. The motor vehicle according to claim 2, wherein a transmission output is coupled, via gearing, to a hollow shaft which is coupled to an input element of the torque distribution unit via the freewheel.

4. The motor vehicle according to claim 2, wherein the torque distribution unit is a multi-plate clutch.

5. The motor vehicle according to claim 1, wherein a transmission output is coupled, via gearing, to a hollow shaft which is coupled to an input element of the torque distribution unit via the freewheel.

6. The motor vehicle according to claim 5, wherein the input element is coupled to an output element, via which the torque distribution unit is coupled to a cardan shaft coupled to the rear axle.

7. The motor vehicle according to claim 6, wherein the torque distribution unit is a multi-plate clutch.

8. The motor vehicle according to claim 6, wherein the multi-plate clutch has an outer plate carrier which is coupled to the hollow shaft via the freewheel and which is coupled to an output shaft forming the output element.

9. The motor vehicle according to claim 8, wherein the torque distribution unit is a multi-plate clutch.

10. The motor vehicle according to claim 5, wherein the torque distribution unit is a multi-plate clutch.

11. The motor vehicle according to claim 1, wherein the torque distribution unit is a multi-plate clutch.

12. The motor vehicle according to claim 11, wherein the multi-plate clutch has an outer plate carrier which is coupled to the hollow shaft via the freewheel and which is coupled to an output shaft forming the output element.

* * * * *